United States Patent
Lee et al.

(10) Patent No.: US 8,778,220 B2
(45) Date of Patent: Jul. 15, 2014

(54) WHOLLY AROMATIC LIQUID CRYSTAL POLYESTER RESIN COMPOUND WITH IMPROVED HEAT RESISTANCE, AND PREPARATION METHOD THEREOF

(75) Inventors: Myung Se Lee, Daejeon (KR); Youn Eung Lee, Daejeon (KR); Young Hak Shin, Daejeon (KR); Jin Kyu Lee, Busan (KR); Mahn Jong Kim, Daejeon (KR)

(73) Assignee: Samsung Fine Chemicals Co., Ltd. (KR)

( * ) Notice: Subject to any disclaimer, the term of this patent is extended or adjusted under 35 U.S.C. 154(b) by 81 days.

(21) Appl. No.: 13/498,720

(22) PCT Filed: Oct. 8, 2010

(86) PCT No.: PCT/KR2010/006917
§ 371 (c)(1),
(2), (4) Date: Mar. 28, 2012

(87) PCT Pub. No.: WO2011/043634
PCT Pub. Date: Apr. 14, 2011

(65) Prior Publication Data
US 2012/0193571 A1  Aug. 2, 2012

(30) Foreign Application Priority Data

Oct. 9, 2009 (KR) .................. 10-2009-0096389

(51) Int. Cl.
*C09K 19/38* (2006.01)
*C09K 19/54* (2006.01)
*C08K 3/00* (2006.01)
*H01B 3/42* (2006.01)
*H01B 3/47* (2006.01)

(52) U.S. Cl.
USPC ............... 252/299.01; 252/299.5; 524/80; 524/401; 524/425; 524/436; 524/437; 524/442; 524/445; 524/449; 524/451; 524/701; 524/788; 524/789; 524/847

(58) Field of Classification Search
USPC ............ 252/299.01, 299.5; 524/80, 401, 425, 524/436, 437, 442, 445, 449, 451, 701, 788, 524/789, 847
See application file for complete search history.

(56) References Cited

U.S. PATENT DOCUMENTS

| 5,124,397 A | 6/1992 | Kanazawa et al. |
| 5,221,729 A | 6/1993 | Kanaka et al. |
| 2003/0008969 A1* | 1/2003 | Takahashi ............... 524/588 |
| 2005/0256291 A1 | 11/2005 | Okamoto et al. |
| 2006/0022378 A1 | 2/2006 | Fukatsu et al. |
| 2006/0237451 A1* | 10/2006 | Sameuls et al. ........... 219/730 |

FOREIGN PATENT DOCUMENTS

| EP | 0653460 | 5/1995 |
| JP | 01165667 A | 6/1989 |
| JP | 03265650 A | 11/1991 |
| JP | 06172619 A | 6/1994 |
| JP | 06207083 A | 7/1994 |
| JP | 2004175812 A | 6/2004 |
| JP | 2006057005 A | 3/2006 |
| JP | 2009-114224 | 5/2009 |
| JP | 2010065179 A | 3/2010 |
| JP | 2010089492 A | 4/2010 |

OTHER PUBLICATIONS

English translation for JP 6172619 by computer, http://www4.ipdl.inpit.go.jp/Tokujitu/PAJdetail.ipdl?N0000=60&N0120=01&N2001=2&N3001=H06-172619.*
Arai, "Structure and Properties of Pitch-Based Carbon Fibers", Nippon Steel Techinacal Report, No. 59, pp. 65-70, Oct. 1993.*
International Search Report—PCT/KR2010/006917 dated Jun. 21, 2011.
Written Opinion—PCT/KR2010/006917 dated Jun. 21, 2011.
Extended European Search Report Application No. 10822279.5 dated Aug. 28, 2013.
Japanese Office Action with English Translation for Application No. 2012-533092 dated Jan. 30, 2014.

* cited by examiner

*Primary Examiner* — Shean C Wu
(74) *Attorney, Agent, or Firm* — Cantor Colburn LLP

(57) ABSTRACT

Disclosed are a wholly aromatic liquid crystal polyester resin compound and a preparation method thereof. The disclosed wholly aromatic liquid crystal polyester resin compound comprises a wholly aromatic liquid crystal polyester resin having a high melting point, and an inorganic filler having a high thermal conductivity. In addition, the disclosed wholly aromatic liquid crystal polyester resin compound can be prepared by using a twin screw extruder having a barrel temperature of 350 to 450° C.

4 Claims, No Drawings

WHOLLY AROMATIC LIQUID CRYSTAL POLYESTER RESIN COMPOUND WITH IMPROVED HEAT RESISTANCE, AND PREPARATION METHOD THEREOF

TECHNICAL FIELD

The present invention relates to a wholly aromatic liquid crystalline polyester resin compound and a method of preparing the same, and more particularly, to a wholly aromatic liquid crystalline polyester resin compound including a wholly aromatic liquid crystalline polyester resin having a high melting point and an inorganic filler having a high thermal conductivity and a method of preparing the same.

BACKGROUND ART

Wholly aromatic liquid crystalline polyester resins have good physical properties of heat resistance, dimensional stability, and fluidity when being melted, and thus, are widely used around the world, mainly in the electronic parts industry, as materials for injection molding. Particularly, due to excellent dimensional stability and electricity insulation performance, the usage of the wholly aromatic liquid crystalline polyester resin has been expanding into films and substrates for electronic materials, connectors for electronics, and other materials for bobbins.

A wholly aromatic liquid crystalline polyester resin, which is a thermoplastic polymer prepared by condensation polymerization, may be kneaded with an inorganic filler such as a glass fiber and talc and extruded in order to prepare a wholly aromatic liquid crystalline polyester resin compound. In addition, the wholly aromatic liquid crystalline polyester resin compound may be processed by injection molding to form an injection-molded product.

Since connectors of electronics or bobbins in which the wholly aromatic liquid crystalline polyester resin compound is used generate a large amount of heat, they need to have excellent heat resistance. However, since the wholly aromatic liquid crystalline polyester resin and inorganic fillers which are main materials for the wholly aromatic liquid crystalline polyester resin compound respectively have very low thermal conductivity less than or equal to 0.2 W/mK, the wholly aromatic liquid crystalline polyester resin compound, including the materials, has low thermal conductivity, and an injection-molded product including the wholly aromatic liquid crystalline polyester resin compound also has low heat resistance and durability.

DETAILED DESCRIPTION OF THE INVENTION

Technical Problem

The present invention provides a wholly aromatic liquid crystalline polyester resin compound including a wholly aromatic liquid crystalline polyester resin having a high melting point and an inorganic filler having a high thermal conductivity.

The present invention also provides a method of preparing the wholly aromatic liquid crystalline polyester resin compound.

Technical Solution

According to an aspect of the present invention, there is provided a wholly aromatic liquid crystalline polyester resin compound including: a wholly aromatic liquid crystalline polyester resin having a melting point in the range of 310 to 450° C.; and a first inorganic filler having a thermal conductivity in the range of 200 to 500 W/mK.

The first inorganic filler may include at least one selected from the group consisting of boron nitride, silicon carbide, graphite, boron phosphide, aluminum nitride, titanium dioxide, barium sulfite, and silicon dioxide.

The content of the first inorganic filler may be in the range of 5 to 90 parts by weight based on 100 parts by weight of the wholly aromatic liquid crystalline polyester resin.

The wholly aromatic liquid crystalline polyester resin compound may further include a second inorganic filler having a thermal conductivity greater than 0 and less than 200 W/mK.

The second inorganic filler may include at least one selected from the group consisting of glass fiber, talc, calcium carbonate, mica, and clay.

The content of the second inorganic filler may be in the range of 5 to 90 parts by weight based on 100 parts by weight of the wholly aromatic liquid crystalline polyester resin.

According to an aspect of the present invention, there is provided a method of preparing a wholly aromatic liquid crystalline polyester resin compound, the method including mixing a wholly aromatic liquid crystalline polyester resin having a melting point in the range of 310 to 450° C., and an inorganic filler having a thermal conductivity in the range of 200 to 500 W/mK, and melt-kneading the mixture.

The melt-kneading of the mixture of the wholly aromatic liquid crystalline polyester resin and the inorganic filler may be performed in a twin-screw extruder having a barrel, a temperature of which is maintained in the range of 350 to 450° C.

Advantageous Effects

According to the one or more of the above embodiments of the present invention, a wholly aromatic liquid crystalline polyester resin compound that has excellent thermal conductivity and improved heat resistance may be prepared by including a wholly aromatic liquid crystalline polyester resin having a high melting point and an inorganic filler having a high thermal conductivity.

According to another embodiment of the present invention, a method of preparing a wholly aromatic liquid crystalline polyester resin compound that is durable in a high-temperature processing may be provided.

BEST MODE FOR CARRYING OUT THE INVENTION

Hereinafter, a wholly aromatic liquid crystalline polyester resin compound and a method of preparing the same, according to embodiments of the present invention, will be described in detail. As used herein, the term "and/or" includes any and all combinations of one or more of the associated listed items. Expressions such as "at least one of," when preceding a list of elements, modify the entire list of elements and do not modify the individual elements of the list.

A wholly aromatic liquid crystalline polyester resin compound according to an embodiment of the present invention includes a wholly aromatic liquid crystalline polyester resin having a melting point in the range of 310 to 450° C. and a first inorganic filler having a thermal conductivity in the range of 200 to 500 W/mK. By including the wholly aromatic liquid crystalline polyester resin having a high melting point and the first inorganic filler having a high thermal conductivity, thermal conductivity and heat resistance of the wholly aromatic liquid crystalline polyester resin compound may be improved. If the melting point of the wholly aromatic liquid crystalline polyester resin is less than 310° C., fluidity is too high in a high-temperature processing range over 350° C., so that processability thereof may decrease. On the other hand, if the melting point of the wholly aromatic liquid crystalline polyester resin is greater than 450° C., fluidity is insufficient in the high-temperature processing range, so that processability may decrease. Furthermore, if the thermal conductivity of the first inorganic filler is less than 200 W/mK, thermal conductivity of the wholly aromatic liquid crystalline polyester resin compound is insufficient. On the other hand, if the thermal conductivity of the first inorganic filler is greater than 500 W/mK, the injection-molded products so quickly cool after an injection molding of the wholly aromatic liquid crystalline polyester resin compound, so that productivity may decrease.

Due to the high melting point, the wholly aromatic liquid crystalline polyester resin has a high heat resistance. The wholly aromatic liquid crystalline polyester resin may be prepared according to the following steps:

(a) synthesizing a wholly aromatic liquid crystalline polyester prepolymer by condensation-polymerizing at least two monomers; and (b) synthesizing a wholly aromatic liquid crystalline polyester resin by solid phase condensation polymerizing the wholly aromatic liquid crystalline polyester prepolymer.

The at least two monomers used in step (a) may include at least one compound selected from the group consisting of aromatic diol, aromatic diamine, and aromatic hydroxylamine; and aromatic dicarboxylic acid. In addition, the monomers may further include aromatic hydroxycarboxylic acid and/or aromatic aminocarboxylic acid.

The synthesis of step (a) may be performed using solution condensation polymerization or bulk condensation polymerization. In addition, a monomer having reactivity improved (i.e., acylated monomer) by pre-treatment with chemicals such as an acylating agent (particularly, acetylating agent) may be used in step (a) in order to expedite the condensation polymerization.

To perform the solid phase condensation polymerization in step (b), the prepolymer is required to be heated using, for example, a heating plate, hot air, hot fluid, or the like. By-products produced during the solid phase condensation polymerization may be removed by purging with inert gas or by applying vacuum thereto.

The wholly aromatic liquid crystalline polyester resin may include a variety of repeating units in a chain thereof. For example, the repeating units are:

(1) A repeating unit derived from aromatic diol: —O—Ar—O—

(2) A repeating unit derived from aromatic diamine: —HN—Ar—NH—

(3) A repeating unit derived from aromatic hydroxylamine: —HN—Ar—O—

(4) A repeating unit derived from aromatic dicarboxylic acid: —OC—Ar—CO—

(5) A repeating unit derived from aromatic hydroxycarboxylic acid: —O—Ar—CO—

(6) A repeating unit derived from aromatic aminocarboxylic acid: —HN—Ar—CO—

In the formulae defined above, Ar may be phenylene, biphenylene, naphthalene, an aromatic compound in which two phenylenes are bonded to each other via a carbon or non-carbon element, or an aromatic compound selected from the group consisting of phenylene, biphenylene, naphthalene, or two phenylenes bonded to each other by carbon or a non-carbon element in which at least one hydrogen atom is substituted with other elements.

The first inorganic filler may include at least one selected from the group consisting of boron nitride, silicon carbide, graphite, boron phosphide, aluminum nitride, titanium dioxide, barium sulfite, and silicon dioxide. The first inorganic filler improves thermal conductivity of the wholly aromatic liquid crystalline polyester resin composition and the wholly aromatic liquid crystalline polyester resin compound including the first inorganic filler, so that heat is quickly discharged.

The content of the first inorganic filler may be in the range of 5 to 90 parts by weight based on 100 parts by weight of the wholly aromatic liquid crystalline polyester resin. If the content of the first inorganic filler is less than 5 parts by weight based on 100 parts by weight of the wholly aromatic liquid crystalline polyester resin, the wholly aromatic liquid crystalline polyester resin compound cannot have sufficient thermal conductivity. On the other hand, if the content of the first inorganic filler is greater than 90 parts by weight based on 100 parts by weight of the wholly aromatic liquid crystalline polyester resin, mechanical properties of the wholly aromatic liquid crystalline polyester resin compound considerably deteriorate.

The wholly aromatic liquid crystalline polyester resin compound may further include a second inorganic filler having a thermal conductivity greater than 0 and less than 200 W/mK. The second inorganic filler improves the mechanical strength of the wholly aromatic liquid crystalline polyester resin compound including the same.

The second inorganic filler may include at least one selected from the group consisting of glass fiber, talc, calcium carbonate, mica, and clay.

The content of the second inorganic filler may be in the range of 5 to 90 parts by weight based on 100 parts by weight of the wholly aromatic liquid crystalline polyester resin. If the content of the second inorganic filler is less than 5 parts by weight based on 100 parts by weight of the wholly aromatic liquid crystalline polyester resin, the wholly aromatic liquid crystalline polyester resin compound cannot have sufficient mechanical strength. On the other hand, if the content of the second inorganic filler is greater than 90 parts by weight of the wholly aromatic liquid crystalline polyester resin, thermal conductivity of the wholly aromatic liquid crystalline polyester resin compound considerably deteriorates.

The wholly aromatic liquid crystalline polyester resin compound may be prepared by preparing a resin composition by mixing a wholly aromatic liquid crystalline polyester resin having a melting point in the range of 310 to 450° C. and an inorganic filler having a thermal conductivity in the range of 200 to 500 W/mK, and melt-kneading the resin composition. The resin composition, including the wholly aromatic liquid crystalline polyester resin having a high melting point and the first inorganic filler having a high thermal conductivity, may be processed, i.e., melt-kneaded, without thermal deformation at a high temperature due to high heat resistance and thermal conductivity. Thus, a product prepared by processing the resin compound at a high temperature greater than or equal to 350□ may be obtained.

In addition, in the melt-kneading, a twin-screw extruder, a batch type kneader, a mixing roll, or the like may be used. Particularly, when the melt-kneading is performed using a twin-screw extruder, the temperature of a barrel of the twin-screw extruder may be maintained in the range of 350 to 450° C. In this regard, the barrel of the twin-screw extruder is a container in which raw materials to be extruded, i.e., the resin composition, are melted, kneaded, and transported, and refers to a cylinder. A screw is installed in the barrel. The raw materials to be extruded are transported in a forward direction according to the rotation of the screw, and simultaneously, the raw materials are melted by heat transmitted from walls of the barrel. A lubricant may also be used during the melt-kneading to increase processability.

Hereinafter, one or more embodiments will be described in detail with reference to the following examples. However, these examples are not intended to limit the purpose and scope of the invention.

EXAMPLES

Example 1

(1) Preparation of Wholly Aromatic Liquid Crystalline Polyester Resin 24.4 kg of p-hydroxybenzoic acid, 10.8 kg of biphenol, 7.3 kg of terephthalic acid, and 2.4 kg of isophthalic acid were added to a 100 L batch reactor, the temperature of which is controllable. Nitrogen gas was injected to the reactor to inactivate the inside of the reactor, and then 33 kg of acetic anhydride was added thereto. Then, the temperature of the reactor was increased up to 150° C. for 30 minutes and the alcohol functional group of the monomers was acetylated at the same temperature for 3 hours. Then, the temperature of the reactor was increased up to 300° C. for 6 hours while removing acetic acid that is produced during the acetylation to prepare a wholly aromatic liquid crystalline polyester prepolymer by condensation polymerization of the monomers. Acetic acid, which is a by-product of the preparation of the wholly aromatic liquid crystalline polyester prepolymer, was also continuously removed during the preparation of the wholly aromatic liquid crystalline polyester prepolymer with the acetic acid produced during the acetylation. Then, the wholly aromatic liquid crystalline polyester prepolymer was collected from the reactor and cooled and solidified.

Then, the wholly aromatic liquid crystalline polyester prepolymer was ground to have an average particle diameter of 1 mm, and 20 kg of the ground wholly aromatic liquid crystalline polyester prepolymer was added to a 100 L rotary kiln reactor. The temperature of the 100 L rotary kiln reactor was increased to 200° C. where weight loss of prepolymer is initiated for 1 hour while flowing nitrogen at a rate of 1 N m$^3$/hr. Then, the temperature was increased up to 320° C. for 10 hours and maintained at 320° C. for 3 hours to prepare a wholly aromatic liquid crystalline polyester resin. Then, the reactor was cooled to room temperature for 1 hour, and the wholly aromatic liquid crystalline polyester resin was collected from the reactor.

A melting point of the wholly aromatic liquid crystalline polyester resin measured using a differential scanning calorimetry (DSC) was 370° C.

(2) Preparation of Wholly Aromatic Liquid Crystalline Polyester Resin Compound 1

The wholly aromatic liquid crystalline polyester resin prepared in Example 1 (1), a glass fiber (Sungjin Fiber Co., Ltd., MF150W-NT), and graphite (KOMEX) having a thermal conductivity of 400 W/mK were mixed at a weight ratio of 6:2:2, and the mixture was melt-kneaded using a twin-screw extruder (L/D: 40, diameter: 20 mm). The temperature of the barrel of the twin-screw extruder was 400° C. during the melt-kneading. While the mixture was melt-kneaded, by-products were removed therefrom by applying vacuum to the twin-screw extruder.

Then, the melt-kneaded mixture was mixed in an automatic mixing unit (Jeil Industrial Device Co., Ltd.) for 10 minutes, and dried in an hot-air dryer (A-Sung Plant Co., Ltd.) at 130° C. for 2 hours to prepare a wholly aromatic liquid crystalline polyester resin compound 1.

Example 2

A wholly aromatic liquid crystalline polyester resin compound 2 was prepared in the same manner as in Example 1, except that the weight ratio of the wholly aromatic liquid crystalline polyester resin prepared according to Example 1 (1), the glass fiber (Sungjin Fiber Co., Ltd., MF150W-NT), and the graphite (KOMEX) having a thermal conductivity of 400 W/mK was 6:1:3.

Comparative Example 1

A wholly aromatic liquid crystalline polyester resin compound 3 was prepared in the same manner as in Example 1, except that a wholly aromatic liquid crystalline polyester resin (Samsung Fine Chemicals Co., Ltd.) having a melting point of 300° C. was used instead of the wholly aromatic liquid crystalline polyester resin prepared according to Example 1 (1).

Comparative Example 2

A wholly aromatic liquid crystalline polyester resin compound 4 was prepared in the same manner as in Example 1, except that the weight ratio of the wholly aromatic liquid crystalline polyester resin prepared according to Example 1 (1), the glass fiber (Sungjin Fiber Co., Ltd., MF150W-NT), and the graphite (KOMEX) having a thermal conductivity of 400 W/mK was 6:4:0, that is, the graphite was not used.

Evaluation Example

Physical properties of the wholly aromatic liquid crystalline polyester resin compounds 1 to 4 prepared according to Examples 1 and 2 and Comparative Examples 1 and 2 were measured using the following methods.

Flexural Strength and Flexural Modulus

Flexural strength and flexural modulus of the wholly aromatic liquid crystalline polyester resin compounds 1 to 4 were measured according to ASTM D790.

Heat Resistance (Heat Distortion Temperature)

Heat resistance of the wholly aromatic liquid crystalline polyester resin compounds 1 to 4 was measured according to ASTM D648. The pressure applied thereto was 18.5 kgf/cm$^2$.

TABLE 1

| | Example 1 | Example 2 | Comparative Example 1 | Comparative Example 2 |
|---|---|---|---|---|
| Flexural Strength (MPa) | 150 | 160 | 120 | 135 |
| Flexural modulus (Gpa) | 14 | 14 | 11 | 12 |
| Heat resistance (° C.) | 330 | 335 | 290 | 320 |

Referring to Table 1, the wholly aromatic liquid crystalline polyester resin compounds prepared in Examples 1 and 2 had better flexural strength, flexural modulus, and heat resistance than the wholly aromatic liquid crystalline polyester resin compounds prepared in Comparative Examples 1 and 2.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A wholly aromatic liquid crystalline polyester resin compound for electronic parts comprising:
    a wholly aromatic liquid crystalline polyester resin having a melting point in the range of 310 to 450° C.;
    a first inorganic filler having a thermal conductivity in the range of 200 to 500 W/mK; and a second inorganic filler having a thermal conductivity greater than 0 and less than 200 W/mK, wherein the second inorganic filler comprises at least one selected from the group consisting of glass fiber, talc, calcium carbonate, mica and clay.

2. The wholly aromatic liquid crystalline polyester resin compound for electronic parts of claim 1, wherein the first inorganic filler comprises at least one selected from the group consisting of boron nitride, silicon carbide, graphite, boron phosphide, aluminum nitride, titanium dioxide, barium sulfite, and silicon dioxide.

3. The wholly aromatic liquid crystalline polyester resin compound for electronic parts of claim 1, wherein the content of the first inorganic filler is in the range of 5 to 90 parts by weight based on 100 parts by weight of the wholly aromatic liquid crystalline polyester resin.

4. The wholly aromatic liquid crystalline polyester resin compound for electronic parts of claim 1, wherein the content of the second inorganic filler is in the range of 5 to 90 parts by weight based on 100 parts by weight of the wholly aromatic liquid crystalline polyester resin.

* * * * *